United States Patent [19]

Burkhard et al.

[11] 4,321,106

[45] Mar. 23, 1982

[54] METHOD OF AND APPARATUS FOR THE THERMAL TREATMENT OF FLOWABLE MATERIAL

[75] Inventors: Lorenz Burkhard, Zurich; Hans Fäs, Schlieren, both of Switzerland

[73] Assignee: Luwa AG, Zurich, Switzerland

[21] Appl. No.: 164,190

[22] Filed: Jun. 30, 1980

[30] Foreign Application Priority Data

Jul. 10, 1979 [CH] Switzerland .................. 6405/79

[51] Int. Cl.³ .................................................. B01D 1/22
[52] U.S. Cl. .................................... 159/49; 159/6 W; 159/13 C
[58] Field of Search ............ 159/6 R, 6 W, 13 A, 159/16, 49, 13 C

[56] References Cited

U.S. PATENT DOCUMENTS

| | | | |
|---|---|---|---|
| 1,164,413 | 12/1915 | Shaw | 159/13 A |
| 2,546,380 | 3/1951 | Zahm | 159/6 W |
| 3,060,297 | 10/1962 | Sargeant | 159/13 A |
| 4,193,837 | 3/1980 | Wyss et al. | 159/6 W |

*Primary Examiner*—Norman Yudkoff
*Attorney, Agent, or Firm*—Werner W. Kleeman

[57] ABSTRACT

A method of thermally treating flowable material by spreading the material mechanically on a wall of a treatment chamber, wherein resulting vapors are passed co-currently with the material in a first upstream section of the treatment zone, and counter-currently in an adjoining second, downstream, section of the treatment zone and removed from the treatment zone through an inlet to a discharge tube which inlet is generally in a transverse plane between the sections.

15 Claims, 6 Drawing Figures

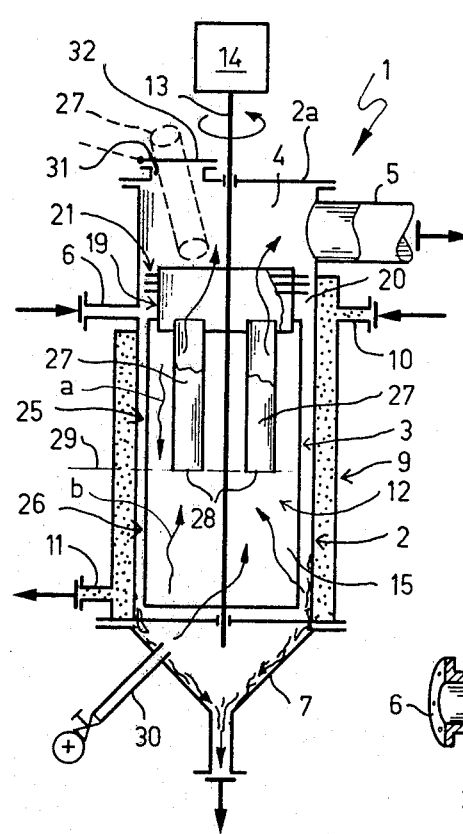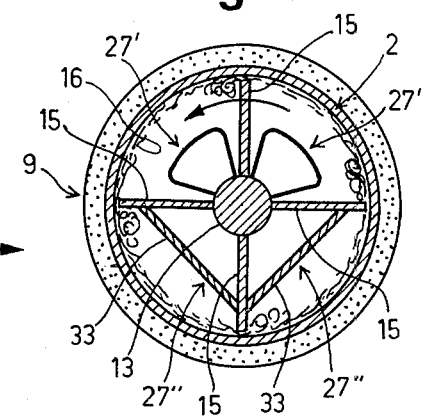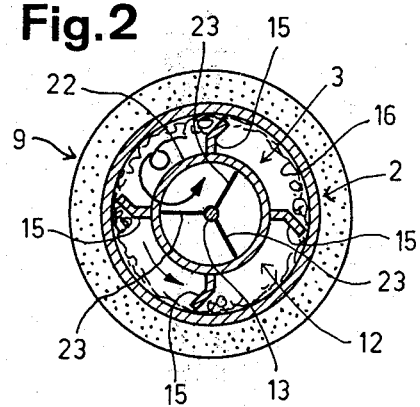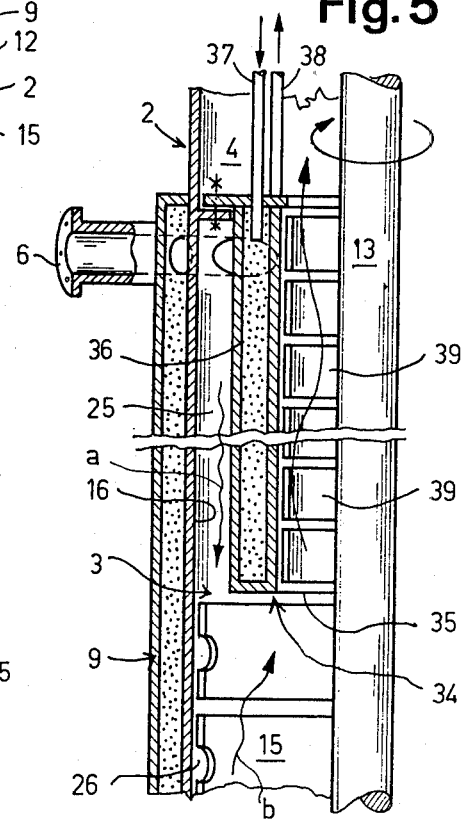

METHOD OF AND APPARATUS FOR THE THERMAL TREATMENT OF FLOWABLE MATERIAL

The present invention relates to a method of and apparatus for the thin layer thermal treatment of flowable material of the type where the material is spread mechanically on a treatment wall.

In such thin layer material treating apparatus, it is known to pass associated vapours co-current or counter-current to the material being treated. While co-current passage of the vapours makes possible a rapid and intensive vaporisation, counter-current passage enables a high end concentration of the treated material to be achieved. Equally, both arrangements have certain disadvantages. Thus, with apparatus for counter-current operation, there is a risk of thermally untreated, drop-like particles being entrained by the vapour stream, which is removed from the upper end of the apparatus, which particles must then be recovered in a separate precipitator. With apparatus for co-current operation, however, the vapours are usually removed via a radially extending branch line in the material outlet region at the lower end of the apparatus. In this region, the spreading elements cannot fully cooperate with the wall and can thus not exert a conveying action. This is a particular disadvantage where the material at this point has a high viscosity so that it will not move without mechanical assistance.

It has been proposed to employ apparatus in which, while the vapours are removed at the upper end of the apparatus, entrainment of untreated particles is to be prevented by passing the vapours co-currently in an initial zone of the treatment chamber adjoining the inlet. German patent specification No. 401,444 and U.S. Pat. No. 2,927,634 make this suggestion. For this purpose, a vapour extraction pipe leading to a vapour collection chamber at the top extends down the full length of the interior of the material treatment chamber. Near the inlet, the vapour extraction pipe has a continuous wall so that vapours cannot get into it, but below that the pipe is provided with holes, through which the vapours can enter. However, in this lower region, undefined and uncontrollable flow conditions prevail because of the multiplicity of holes in the pipe wall, and this adversely affects the process of treating the material.

It is the object of the present invention to overcome or reduce the above difficulties so that a larger vaporisation ratio can be achieved together with a high end concentration.

According to the present invention, there is provided a method of thermally treating flowable material by spreading the material mechanically on a wall of a treatment chamber, wherein resulting vapours are passed co-currently with the material in a first upstream section of the treatment zone, and countercurrently in an adjoining second, downstream section of the treatment zone and removed from the treatment zone through an inlet to a discharge tube which inlet is generally in a transverse plane between the sections.

It has been found that by sharply separating the co-current and counter-current vapour flow zones, advantages of both the co-current principle and the counter-current principle can be obtained simultaneously. This separation is in a plane transverse to the direction of material movement, preferably perpendicular thereto. A result of this precisely defined transition between the zones is that clearly defined conditions prevail in each. Since the material flow is relatively undisturbed in the co-current zone, and the vapours produced therein pass downwards towards the point of extraction at the junction between the zones, undesired entrainment of untreated particles by the extracted vapours can be largely avoided.

The sharp separation between the zones also makes it possible, by applying a stripping medium, to select different partial pressures, thus determining the mass transfer, in the two zones.

The invention also provides apparatus for thermally treating a flowable material, such apparatus including a treatment chamber having a material inlet, means to spread the material on the wall of the chamber and an outlet for treated material, a vapour extraction tube extending into the chamber from the material inlet end, the tube having an inlet within the chambers, and the inlet lying generally in a plane transverse to the chamber axis, so that in the section of the chamber between the material inlet and said plane vapours flow co-currently with the material towards the tube inlet, while, between the material outlet and the plane, vapours flow countercurrently towards the tube inlet.

Since the vapour extraction tube is open towards the outlet end of the chamber, any particles which may deposit on the inside of the vapour extraction tube can pass back into the treatment chamber.

It is evident that, in order to make the vapour flow relatively undisturbed, the co-current zone, that is to say the vapour-impermeable section of the vapour extraction element, must have a significant length, preferably $\frac{1}{4}$ at least of the length of the countercurrent zone. Material-distributing devices which protrude only slightly into the treatment chamber, and extend only over the inlet region of the material, and which have passages for vapours, such as are known from German published patent specification No. 1,363,224, are not sufficient.

In order that the invention may be more clearly understood, the following description is given, merely by way of example, with reference to the accompanying drawings in which:

FIG. 2 shows a section along the line II—II of FIG. 1;

FIG. 3 shows a longitudinal section through a second embodiment of thin-layer apparatus of the invention;

FIG. 4 shows a cross-section through the apparatus of FIG. 3;

FIG. 5 shows, in longitudinal section, part of a third embodiment of a thin-layer apparatus of the invention.

Figure 1:
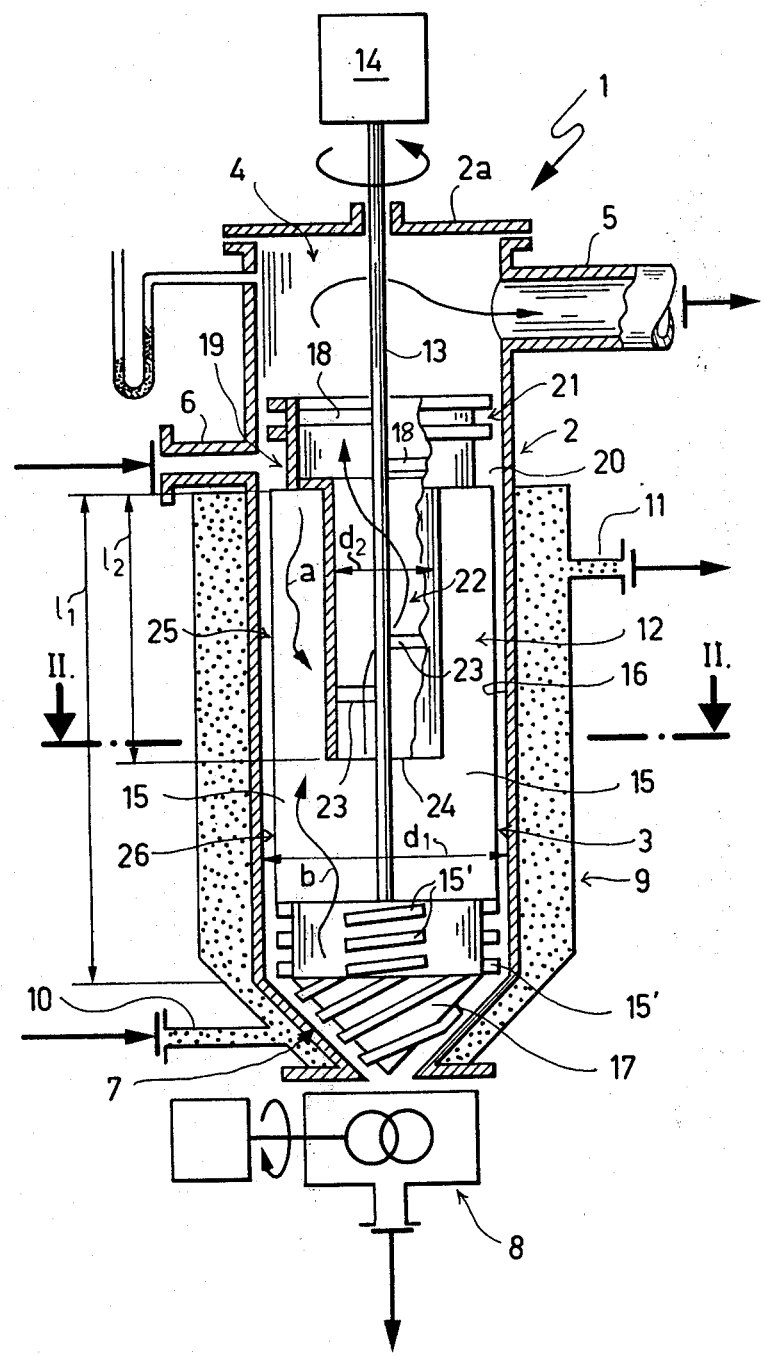
FIG. 1 shows a longitudinal section through a thin-layer apparatus of the invention for treating materials of relatively high viscosity.

The thin-layer material treating apparatus indicated at 1 in FIGS. 1 and 2 has a cylindrical upright vessel 2. In the interior of this vessel, there are a treatment chamber 3 and, above this, a vapour collection chamber 4. An outlet nozzle 5 is connected to the vapour collection chamber 4. An inlet nozzle 6 for the material to be treated leads into the upper end of the treatment chamber 3. At its bottom, the treatment chamber 3 merges into a conical material outlet nozzle 7. This outlet nozzle 7 is connected to a discharge device 8 of known type, which serves to discharge the highly viscous end product.

The outside of the treatment chamber 3 is surrounded by a heating or cooling jacket 9 which is provided with an inlet 10 and an outlet 11 for the heating or cooling medium. Instead of this single heating or cooling jacket 9, it is also possible to arrange, axially spaced along the vessel 2, several heating/cooling jackets which can be fed with heating or cooling media of different temperature. It is also possible to surround the vapour collection chamber 4 with a heating or cooling jacket.

In the interior of the vessel 2, a treatment element 12 is provided, the shaft 13 of which extends on the axis of the vessel 2 and is connected to a drive mechanism 14. The treatment element 12 has spreading elements 15 fixed on the shaft 13 to interact with the inner wall 16 of the treatment chamber 3 in order to form a thin layer of material on the wall. As shown in FIG. 2, there are four blade-type, radially extending spreading elements 15 which are bent at their outer ends. In order to move the material, which becomes more viscous as it approaches the outlet region, spreading elements 15' in the end or bottom region of the treatment zone are shaped correspondingly as vanes inclined to the axis and they also serve to locate the treatment element 12. At its lower end, the treatment element 12 has a discharge cone 17 with elements thereon providing a screw effect. In the treatment of low-viscosity materials, the discharge cone 17, the spreading elements 15' and/or the discharge device 8 shown beneath the vessel 2 can be omitted. A storage vessel which can be heated and/or stirred or a degassing device can be provided instead.

In the region of the inlet 6 is a distributor element 19 mounted coaxially with and non-rotatably on the shaft 13 by webs 18. The distributor element 19 is a hollow cylinder. An annular gap 20 which, at its top, is closed off from the vapour collection chamber 4 by a labyrinth seal 21, is formed between the inner wall of the vessel 2 and the distributor element 19.

As thus far described, the apparatus essentially corresponds to known designs. However, it is distinguished by a hollow cylindrical vapour extraction tube 22 coaxial with the shaft 13 and non-rotatably joined thereto by webs 23. The tube 22 is connected to the distributor element 19 and has a slightly smaller diameter than that element. The wall of the extraction tube 22 is not perforated, and it extends from the start of the treatment zone, just below the inlet 6, over only part of the length thereof. At its lower end, the vapour extraction tube 22 has an aperture 24 which lies in a plane which is approximately at right angles to the axis of the vessel and the shaft 13. The tube 22 communicates with the vapour collection chamber 4 via the interior of the distributor element 19. Thus the treatment zone, which starts at the point where the material to be treated is charged onto the treatment wall 16, is divided by the vapour extraction tube 22 into a co-current zone 25 and a counter-current zone 26. These two zones meet in the transverse plane in which the inlet aperture 24 is located.

In FIG. 1, the total length of the treatment zone is marked $l_1$ and the length of the co-current zone 25 is marked $l_2$. The internal diameters of the treatment chamber 3 and of the vapour extraction tube 22 are $d_1$ and $d_2$ respectively.

The mode of operation of the apparatus will now be explained.

Material to be treated is introduced via the inlet nozzle 6 into the treatment chamber 3 and is uniformly circumferentially distributed by the distributor element 19. The material is then spread over the treatment wall 16 in a thin layer by the rotating, driven spreading elements 15. The material moves along the treatment wall 16 towards the outlet nozzle 7. The vapours produced from the material during the initial part of this movement pass down co-currently (arrow a) and are then diverted through the aperture 24 into the interior of the vapour extraction tube 22. Vapours produced in the lower part of the chamber pass upwards, (arrow b) counter-currently, to the aperture 24. From the tube 22, the vapours pass to the vapour collection chamber 4 and are removed via the outlet nozzle 5. At the region of the inlet aperture 24, the co-current vapours are sharply turned through about 180° and any particles of material are precipitated and remain in the treatment chamber. Any particles of material, which may deposit on the outside of the vapour extraction tube 22 are urged back against the treatment wall 16 by centrifugal force. The fully treated material is discharged through the discharge cone 17 and the discharge device 8.

There is a sharp separation between the co-current zone 25 and the counter-current zone 26, in the plane of the inlet aperture 24. Thus, no mixed zone with undefined flow conditions is formed between the two zones 25 and 26. As a result of exploiting the advantages of both the co-current and counter-current principles, a high vaporisation ratio coupled with a high end concentration and a high end viscosity can be achieved. The short residence time permits gentle treatment of the material.

The sharp separation between the zones 25 and 26 makes it possible to reduce the partial pressure in the counter-current zone 26, relative to that in the concurrent zone 25. This can be accomplished by introducing a stripping medium into the counter-current zone 26 via a feed line (not shown) leading into the treatment chamber 3.

On entering the treatment chamber 3, the material can be subjected to a flash vaporisation (flashing), and this method is particularly useful when materials with high solvent contents are treated or when a high vaporisation ratio is to be achieved. In the co-current zone adjoining the inlet region, particles of material are precipitated from the vapour stream by the centrifugal action of the treatment element 12. The sharp deflection, which has been mentioned, of the co-current vapours near the inlet aperture 24 effects a further precipitation of any particles which pass into the vapour stream during the flash vaporisation.

In a particularly advantageous embodiment, the following relationships should be fulfilled (see FIG. 1):

1. Ratio of the lengths of the co-current and counter-current zones $$\Psi = \frac{l_2}{l_1 - l_2} = 0.25 \text{ to } 4$$

2. Overall length/diameter ratio $\lambda = l_1/d_1 = 2$ to 8
3. Length/diameter ratio in the co-current zone $$\lambda_z = \frac{l_2}{d_{hydr.}} = \frac{l_2}{d_1 - d_2} = 2 \text{ to } 40$$

($d_{hydr.}$ being twice the radial distance outside the tube 22)

4. Ratio of the cross-sections in the co-current zone $$\phi z = \frac{d_1^2}{d_2^2} = 0.5 \text{ to } 3$$

Some of the many possible applications of the thin-layer apparatus according to FIGS. 1 and 2 are now described in Examples 1–3 which follow, and in which Examples 1 and 2 concern concentrating a viscous polymer solution based on isoprene, dissolved in cyclohexane and Example 3 concerns concentrating a by-product from a polymer process based on propylene/ethylene, dissolved in hexane.

To carry out these processes, a thin-layer apparatus as described having the following dimensional features was used:
Surface area of the treatment wall 16 (heat exchange area)

1 m² in total

Ratio of the lengths of the co-current and counter-current zones $$\Psi = \frac{l_2}{l_1 - l_2} = 0.8$$

Length/diameter ratio $\lambda = 5.2$
Ratio of the cross-sections in the co-current zone $\phi z = 1.5$ The various process parameters in the three Examples can be seen from Table I below:

TABLE I

| Operating date | | Unit | Example 1 | Example 2 | Example 3 |
|---|---|---|---|---|---|
| Feed: | Rate | kg/hour | 340 | 340 | 1,400 |
| | Concentration | % total solids | 30 | 30 | 4 |
| | Temperature before let-down valve | °C. | 212 | 212 | 215 |
| | Temperature after let-down valve | °C. | 146 | 146 | 135 |
| | Pressure before let-down valve | bar | 20 | 20 | 30 |
| Concentrate: | Rate | kg/hour | 104 | 102 | 57 |
| | Concentration | % total solids | 97.8 | 99.85 | 99 |
| | Temperature | °C. | 225 | 235 | 205 |
| | Viscoaity, approximately | Pa.s | 800 | 800 | 100–200 |
| Vapours: | Rate | kg/hour | 236 | 238 | 1,343 |
| | Temperature | °C. | 175 | 175 | 140 |
| Stripping steam: | Rate | kg/hour | — | 10 | — |
| Heating temperature: | | °C. | 240 | 240 | 245 |
| Internal pressure | absolute | bar | 1.2 | 1.2 | 1 |

Figure 6:
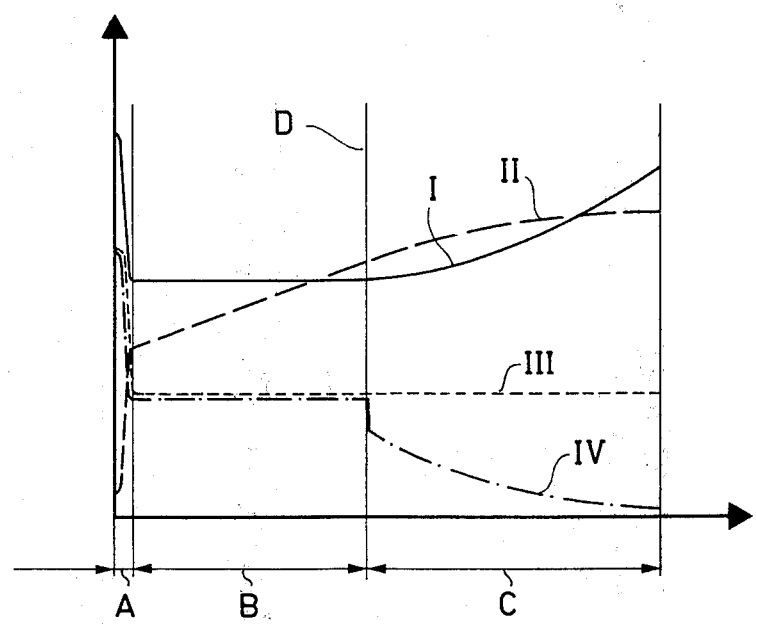
FIG. 6 is a diagram representing the variation of various parameters along the treatment zone.

In FIG. 6, the changes in various parameters along the treatment zone are represented. On the abscissa the inlet zone is shown at A, the co-current zone 25 at B and the counter-current zone 26 at C. D is the plane of the inlet aperture 24 of the vapour extraction tube 22 where the zones meet. The solid curve I represents temperature, and concentration is indicated by the dashed curve II. The operating pressure prevailing in Examples 1 and 3 is represented by the dashed curve III, whilst the dot-dash curve IV shows the operating pressure in Example 2. Flash vaporisation in the inlet zone A takes place in all three Examples.

The curves I–IV clearly show that a sharp and clear separation takes place between the co-current zone B and the counter-current zone C and that there is no intermediate zone with undefined conditions between them.

As Table I shows, Examples 1 and 2 differ in that stripping steam is introduced into the counter-current zone C in Example 2, whereby the partial pressure in this zone is reduced, as shown by curve IV in FIG. 6. As a result of this reduction in the partial pressure, a substantially higher end concentration can be obtained.

Further embodiments of apparatus of the invention will now be described with reference to FIGS. 3–5, in which the same reference numerals as in FIGS. 1 and 2 are used for corresponding parts. The modifications relative to FIGS. 1 and 2 will be discussed.

As shown in FIG. 3, several vapour extraction tubes 27 are provided extending parallel to the shaft 13 of the treatment element 12. These tubes 27 are joined to the distributor element 19 and, if appropriate, also to the shaft 13, and they are each located between two adjacent spreading elements 15, as shown in FIG. 4. An inlet aperture 28 of the tubes 27 lie in the plane which is indicated by dashes and marked 29 and which extends at right angles to the shaft 13. As in the embodiment of FIG. 1, this plane 29 sub-divides and separates the treatment zone into a co-current zone 25 and a counter-current zone 26.

This embodiment uses a feed line 30 to feed a stripping or barrier medium. Such a line can also be provided in the embodiment of FIG. 1. The treatment element 12 in FIG. 3 does not have a discharge cone at its lower end. However, such a discharge cone 17 and a discharge device 8 can of course be provided.

The cover 2a of the vessel 2 has an opening 31 having a closure lid 32. The interior of the vessel 2 is accessible for maintenance purposes through this opening 31, without having to dismantle the entire apparatus. Moreover, the vapour extraction tubes 27 can thus be replaced, for example with tubes of different length, in order to vary the co-current zone/counter-current zone ratio.

It will be understood that the vapour extraction tubes 27 can have any desired shape, various possibilities being shown in FIG. 4. Thus, tubes such as 27′ can be fixed to the shaft 13 which serves as a wall section thereof. Also, tubes such as 27″ can be formed between two adjacent spreading blades 15 by a wall part 33 extending between them.

Where there are several vapour extraction tubes 27, they are preferably so arranged that they are in diametrically opposite pairs.

The mode of operation of the apparatus shown in FIGS. 3 and 4 is essentially the same as of that shown in FIGS. 1 and 2.

In the modification shown in FIG. 5, in contrast, there is a vapour extraction tube 34 which is fixed and does not rotate with the treatment element 12. In this embodiment, the inlet aperture 35 to the vapour extraction tube 34 is again located in a plane which extends approximately at right angles to the shaft 13. The vapour extraction tube 34 can be provided with a heating jacket 36, so that its inside and/or outside can be heated. The heating jacket 36 is provided with a feed line 37 and an outlet line 38 for a heat transfer medium.

By heating the vapour extraction tube 34, deposition of particles on its outside or inside can be avoided.

As shown in FIG. 5, optionally provided conveyor elements 39 are fitted on the shaft 13 within the vapour extraction tube 34. These serve for conveying any materials which may deposit on the inside of the tube 34, back into the treatment chamber 3.

In the embodiment of FIG. 5, the spreading elements 15 do not extend into the annular space between the treatment wall 16 and the outer wall of the vapour extraction tube 34, that is to say into the co-current zone 25. To enable the material fed in to be spread onto the treatment wall 16 in a thin layer, the inlet nozzle 6 extends in a tangential direction. Of course, it is also possible, and essential in many cases, to provide spreading elements in the co-current zone 25, as shown in FIGS. 1 and 3, which extend almost to the opening of the inlet nozzle 6.

Although the vessel 2 is shown upright in all the embodiments shown, other orientations are also possible.

Although the thin-layer apparatus of the invention can be used for the treatment of diverse starting materials, it is particularly suitable for the heat treatment of highly viscous materials and/or materials which tend to foam.

We claim:

1. A method of thermally treating flowable material, comprising the steps of:
   infeeding the material in a treatment chamber having a treatment wall;
   spreading said material along a treatment zone in a thin layer on said treatment wall by mechanical spreading means;
   passing all the resulting vapors only co-currently with the material in a first, upstream section of said treatment zone;
   passing all the resulting vapors only counter-currently with the material in an adjoining second, downstream section of the treatment zone, said sections of the treatment zone abutting upon one another in a plane extending transversely, preferably substantially perpendicular, to the direction of flow of the material; and
   removing the vapors from the treatment zone only in said plane of abutment of said sections of the treatment zone.

2. A method as claimed in claim 1, wherein the material is subjected to flash vaporisation on entry to the treatment chamber.

3. A method as claimed in claim 1, wherein a stripping medium is introduced into the second section of the treatment zone.

4. A method as claimed in claim 1, wherein the length of the first section is at least one quarter of the length of the second section.

5. Apparatus for thermally treating a flowable material, comprising:
   a treatment chamber having a treatment wall and being provided with an inlet for the material to be treated and an outlet for the treated material;
   treatment means extending in the lengthwise direction of the treatment chamber and being provided with at least one spreading element for mechanically spreading said material in a thin layer on said treatment wall along with a treatment zone;
   at least one tubular vapor extraction element extending into said treatment chamber in the direction of flow of said material;
   said at least one tubular vapor extraction element having a section extending from said material inlet along part of said treatment zone and being impervious to vapors;
   said at least one tubular vapor extraction element being provided with an inlet opening at the end of said vapor-impervious section and an outlet at the exterior of said treatment chamber;
   said inlet opening lying in a plane extending transversely, preferably perpendicular, to the axis of said treatment chamber, so that in a section of the treatment chamber between said material inlet and said plane, vapors flow co-currently with the material towards the inlet opening of said tubular element, while, between the end of said treatment zone and the plane, vapors flow counter-currently towards the inlet opening of said tubular element; and
   a feed line for a stripping medium leading into said treatment chamber between said inlet of said tubular element and said material outlet.

6. Apparatus as claimed in claim 5, wherein the length of a section of said chamber in which said vapour extraction element extends is at least ¼ of the length of a section through which it does not extend.

7. Apparatus for thermally treating a flowable material, comprising:
   a treatment chamber having a treatment wall and being provided with an inlet for the material to be treated and an outlet for the treated material;
   treatment means extending in the lengthwise direction of the treatment chamber and being provided with at least one spreading element for mechanically spreading said material in a thin layer on said treatment wall along with a treatment zone;
   at least one imperforate tubular vapor extraction element extending axially into said treatment chamber from said material inlet along only a portion of said treatment zone in the direction of flow of said material;
   said at least one tubular vapor extraction element being provided with an axial inlet opening at the upstream end thereof and an outlet at the exterior of said treatment chamber; and
   said axial inlet opening lying in a plane extending transversely substantially perpendicular to the axis of said treatment chamber, so that in said portion of the treatment zone between said material inlet and said plane, all vapors flow only co-currently with the material towards the inlet opening of said tubular element, while, between the end of said treatment zone and the plane, all resultant vapors flow only counter-currently towards the inlet opening of said tubular element, said vapors being removed from the treatment zone only through said inlet opening.

8. Apparatus as claimed in claim 7, including a vapour collection chamber adjoining said treatment chamber at said one end thereof, said vapour extraction element leading to said vapour collection chamber.

9. Apparatus as claimed in claim 7, wherein said vapour extraction element is coaxial with the means to spread material.

10. Apparatus as claimed in claim 7, wherein said vapour extraction element is fixed.

11. Apparatus as claimed in claim 9, including means to heat said vapour extraction element.

12. Apparatus as claimed in claim 7, wherein said vapour extraction element is rotatable together with the means to spread material.

13. Apparatus as claimed in claim 12 wherein said vapour extraction element is coaxial with said means to spread material.

14. Apparatus as claimed in claim 12, and comprising at least two tubular vapour extraction elements, each said element having an inlet in said plane.

15. Apparatus as claimed in claim 14, wherein said vapor extraction elements are arranged in diametrically opposite pairs with respect to the axis of rotation of said means to spread material.

* * * * *